(12) United States Patent
Arya et al.

(10) Patent No.: US 11,881,982 B2
(45) Date of Patent: Jan. 23, 2024

(54) TRANSACTION-BASED MESSAGING AND LOGGING INFRASTRUCTURE FOR NETWORKING SYSTEMS AND COMPUTING DEVICES

(71) Applicant: ARRIS Enterprises LLC, Suwanee, GA (US)

(72) Inventors: Rishipal Arya, San Jose, CA (US); Daniel S. Lau, Mountain View, CA (US); Renjith Kumar Ponnappan, Fremont, CA (US); Rakesh G. Hansalia, Milpitas, CA (US); Suchit Bansal, Milpitas, CA (US)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 17/838,465

(22) Filed: Jun. 13, 2022

(65) Prior Publication Data

US 2022/0400046 A1    Dec. 15, 2022

Related U.S. Application Data

(60) Provisional application No. 63/210,199, filed on Jun. 14, 2021.

(51) Int. Cl.
*H04L 41/0631* (2022.01)
*H04L 41/085* (2022.01)
*H04L 49/15* (2022.01)

(52) U.S. Cl.
CPC ......... *H04L 41/065* (2013.01); *H04L 41/085* (2013.01); *H04L 49/1553* (2013.01)

(58) Field of Classification Search
CPC .. H04L 41/065; H04L 41/085; H04L 49/1553
USPC ........................................................ 709/224
See application file for complete search history.

(56) References Cited

U.S. PATENT DOCUMENTS

| | | | |
|---|---|---|---|
| 10,637,714 B2* | 4/2020 | Venkataraman | H04L 41/069 |
| 10,778,550 B2* | 9/2020 | Wang | H04L 41/069 |
| 10,931,513 B2* | 2/2021 | Cao Minh | H04L 41/065 |
| 11,025,481 B1* | 6/2021 | Louca | H04L 41/069 |
| 11,271,989 B2* | 3/2022 | Mazzitelli | H04L 41/12 |
| 11,463,299 B2* | 10/2022 | Wu | G06F 16/958 |
| 11,502,902 B2* | 11/2022 | Powell | H04L 41/0816 |
| 11,522,749 B2* | 12/2022 | Kaushal | H04L 45/02 |
| 11,526,405 B1* | 12/2022 | Fisher | G06F 11/1464 |
| 11,625,700 B2* | 4/2023 | Vermeulen | G06F 16/285 |
| | | | 707/703 |

(Continued)

*Primary Examiner* — Melvin H Pollack
(74) *Attorney, Agent, or Firm* — Stewart M. Wiener; Myers Bigel, P.A.

(57) ABSTRACT

Devices, methods, and systems that provide transmitting of messages between different units of a multi-unit system in response to instantiated multi-unit transactions. For example, a method may include: identifying, by a first unit of a multi-unit system of computing devices, an event has occurred that triggers initiation of a transaction; generating, by the first unit, a transaction identifier associated with the transaction, the transaction identifier comprising a unit identifier of the first unit and an application identifier of an application associated with the event; and transmitting, from the first unit and to a second unit of the multi-unit system, the transaction identifier as part of an inter-unit message.

20 Claims, 9 Drawing Sheets

(56) References Cited

U.S. PATENT DOCUMENTS

| | | | |
|---|---|---|---|
| 2014/0280892 A1* | 9/2014 | Reynolds | H04L 43/0876 709/224 |
| 2015/0302481 A1* | 10/2015 | Callahan | G06Q 30/0269 709/224 |
| 2016/0191366 A1* | 6/2016 | Cooke | H04W 4/16 709/224 |
| 2020/0021511 A1* | 1/2020 | Xu | H04L 41/145 |
| 2021/0044474 A1* | 2/2021 | Dang | H04L 41/0686 |
| 2021/0360083 A1* | 11/2021 | Duggal | H04L 67/34 |
| 2022/0094587 A1* | 3/2022 | Tseng | H04L 41/069 |
| 2022/0121628 A1* | 4/2022 | Devaraj | G06F 16/1824 |
| 2022/0182278 A1* | 6/2022 | Vangapalli | H04L 67/30 |
| 2022/0321483 A1* | 10/2022 | Zacks | H04L 47/2458 |
| 2022/0385647 A1* | 12/2022 | Pabón | G06N 20/00 |

\* cited by examiner

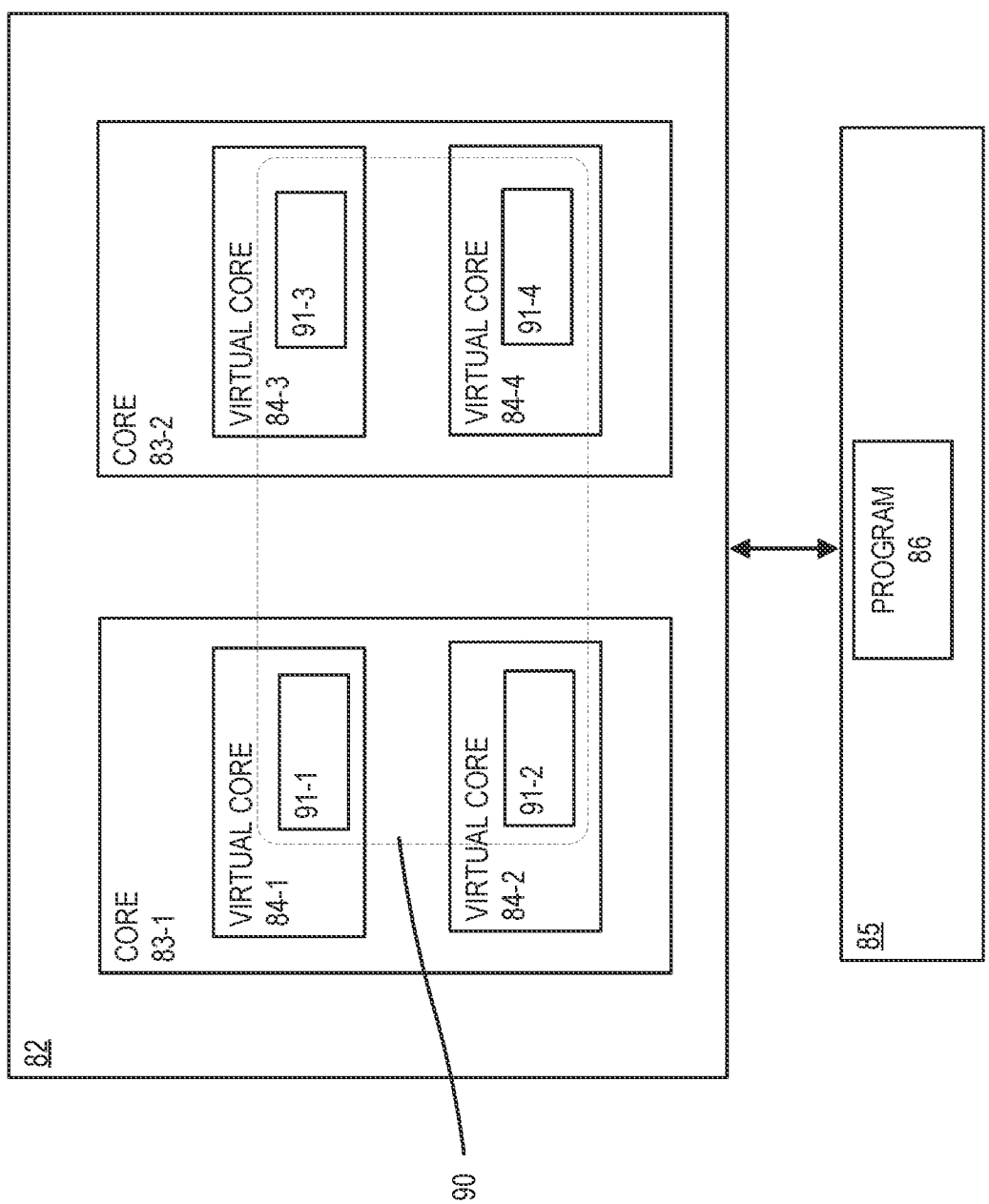

TRANSACTION-BASED MESSAGING AND LOGGING INFRASTRUCTURE FOR NETWORKING SYSTEMS AND COMPUTING DEVICES

CROSS-REFERENCE TO RELATED APPLICATION

The present application claims the benefit of priority to U.S. Provisional Application No. 63/210,199, filed on Jun. 14, 2021, and the entire contents of the above-identified application are incorporated by reference as if set forth herein.

TECHNICAL FIELD

The present disclosure is related to networking systems and computing devices, and in particular is related to transaction-based messaging and logging infrastructure for networking systems and computing devices.

BACKGROUND

Networking systems and computing devices are of increasing interest and importance, and are also becoming increasingly complex. Networking systems include computing devices such as routers and switches that determine and direct data traffic through one or more networks of interconnected computing devices, such as local area networks (LANs), wide area networks (WANs), and/or the Internet. Switches are devices at the data link layer, or layer 2 of the Open Systems Interconnection (OSI) networking model. A switch takes in or receives data from a first computing device connected to a first port of the switch, and then forwards or transmits the data to a second computing device connect to a second port of the switch. The first and second computing devices may be, as examples, computers, servers, printers, or other switches. Routers are computing devices at the network layer, or layer 3 of the OSI networking model. A router works to direct the flow of the data across the network, in part by choosing a route for the data. The data may be encapsulated in various containers at different layers in the networking module.

The computing devices within a networking system (which may also be called "networking devices") may communicate data traffic from an origin computing device toward a destination computing device via one or more data paths. The networking devices may also communicate control traffic between each other as part of providing functionality within the network. This control traffic may include commands, instructions, requests, responses, information (e.g., network topology information), or the like, and may be communicated according to the topology of the network, the capabilities of the networking devices, and their roles within the network. For example, the networking devices may be in a leader/follower relationship, where one or more networking devices (the leaders) control operations of one or more other networking devices (the followers), and accordingly one or more control commands and responses are communicated between the leaders and followers. As another example, the networking devices may be in a peer/peer relationship, where two or more networking devices exchange information among each other without necessarily having one or more networking devices control the operation of the others.

SUMMARY

Aspects of the present disclosure provide systems, methods, and devices that provide transaction-based messaging and logging infrastructure for networking systems and computing devices. For example, some aspects of the present disclosure provide a method, which may include identifying, by a first unit of a multi-unit system of computing devices, that an event has occurred that triggers initiation of a transaction; generating, by the first unit, a transaction identifier associated with the transaction; and transmitting, from the first unit and to a second unit of the multi-unit system, the transaction identifier as part of an inter-unit message. The transaction identifier may include a unit identifier of the first unit and an application identifier of an application associated with the event.

In some embodiments, the method may include recording, by the first unit or the second unit and in a log, a log entry that may include the transaction identifier. In some embodiments, the method may include recording, by the first unit and in a first log associated with the first unit, a log entry may include the transaction identifier; and recording, by the second unit and in a second log associated with the second unit, a log entry may include the transaction identifier. Each of the first log and second log may be a log file or log database. The first unit and second unit may be each switches in a cluster of switches. For example, first unit may be a leader or master switch of the cluster of switches. Identifying the event that has occurred that triggers initiation of the transaction may include identifying that user input has been received by the first unit. The user input may indicate a configuration change of a unit within the multi-unit system. The first unit and second unit may be each switches in a cluster of switches, and the user input indicates a configuration change of a switch within the cluster of switches. Identifying the event that has occurred that triggers initiation of the transaction may include identifying a status of a packet or identifying a status of a packet-handling queue. The transaction identifier may include a sequence number associated with the transaction. The event may be a first event, the transaction may be a first transaction, the transaction identifier may be a first transaction identifier, and the sequence number may be a first sequence number. In some embodiments, the method may include: identifying, by the first unit of a multi-unit system of computing devices, a second event has occurred that triggers initiation of a second transaction, the second event associated with the application; generating, by the first unit, a second transaction identifier associated with the second transaction, the second transaction identifier may include the unit identifier of the first unit, the application identifier, and a second sequence number different from the first sequence number; and transmitting, from the first unit and to the second unit of the multi-unit system, the second transaction identifier as part of an inter-unit message. Generating the transaction identifier may include incrementing a sequence number counter.

Another example of a method provided by the present disclosure may include: receiving, by a second unit of a multi-unit system of computing devices and from a first unit of the multi-unit system, an inter-unit message indicating a transaction identifier associated with a transaction; executing, by the second unit, an operation of the transaction; and recording, by the second unit and in a second log associated with the second unit, a log entry associated with the executed operation of the transaction and may include the transaction identifier. The transaction identifier may include a unit identifier of the first unit and an application identifier of an application executed by the first unit.

Still another example of method provided by the present disclosure may include: identifying, by a first unit of a multi-unit system of computing devices, an event has occurred that triggers initiation of a transaction; executing, by the first unit, an operation of the transaction; detecting, by the first unit, that a transaction identifier associated with the transaction may be to be generated; generating, by the first unit and responsive to the detecting, a transaction identifier associated with the transaction, the transaction identifier may include a unit identifier of the first unit and an application identifier of an application associated with the event; and transmitting, from the first unit and to a second unit of the multi-unit system, the transaction identifier as part of an inter-unit message.

The present disclosure is not limited to the above-identified methods, and other methods are provided herein. The present disclosure is not limited to providing methods, and devices and systems (including devices and systems configured to perform one or more of the provided methods) are described in the present application. Other embodiments of the inventive concepts of the present disclosure will be described herein.

BRIEF DESCRIPTION OF DRAWINGS

FIG. 1C is a block diagram example of a computing device.

Note that like reference numerals refer to corresponding parts throughout the drawings. Moreover, multiple instances of the same part may be designated by a common prefix separated from an instance number by a dash.

DETAILED DESCRIPTION

Figure 1A:
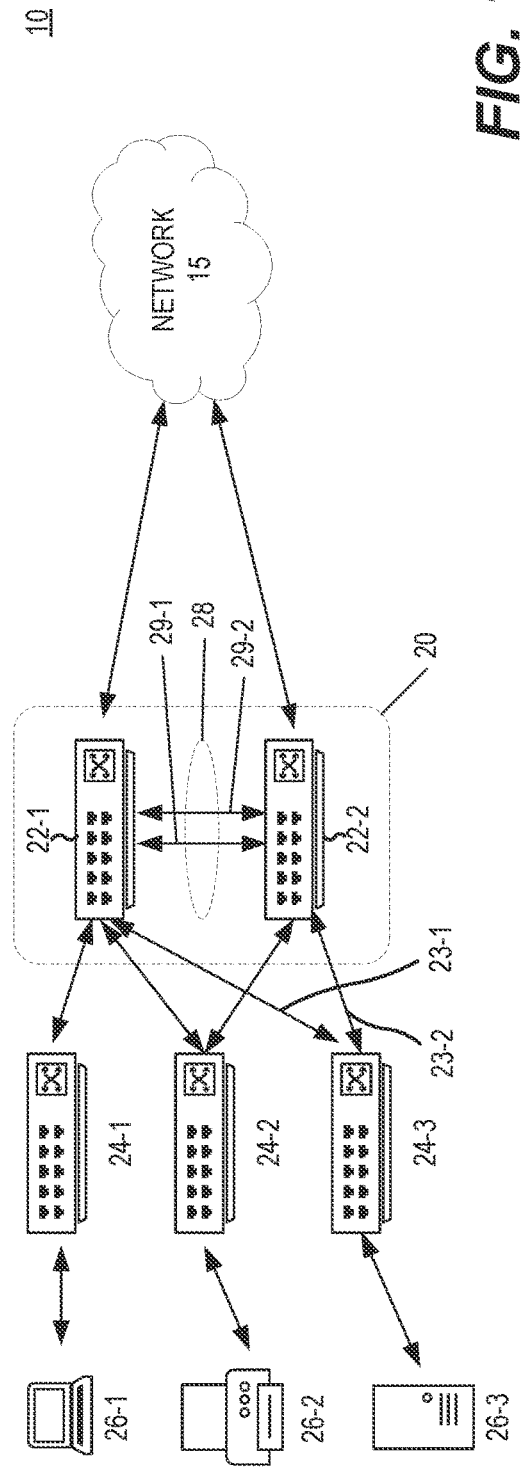
FIG. 1A is a block diagram example of a networking system.
Figure 1B:
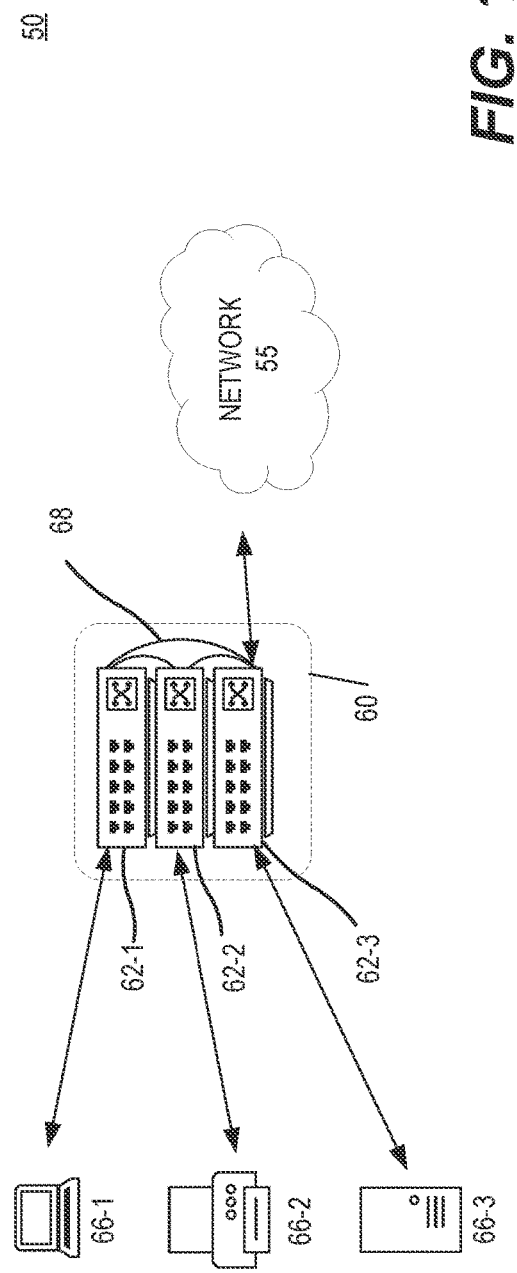
FIG. 1B is a block diagram example of a networking system.

Two or more computing devices (e.g., two or more networking devices) operating in unison with one another may be referred to as a cluster. FIGS. 1A and 1B each illustrate a respective example of a networking system in which a group of networking devices operates as a cluster.

In FIG. 1A and networking system 10 thereof, a cluster 20 may include two core switches 22-1 and 22-2 that are at the core of the networking system 10. The networking system 10 also includes three periphery switches 24-1, 24-2, and 24-3 that are at the periphery of the networking system 10. Client devices 26-1, 26-2, and 26-3 may communicate with network 15 (e.g., the Internet) and/or upstream devices via a data path that includes one of the periphery switches 24 and one of the core switches 22 of the cluster 20. The two core switches 22 of the cluster 20 may be connected via an intra-cluster link 28, which may include one or more physical links. For example, the intra-cluster link 28 may include two physical intra-cluster links 29-1 and 29-2 that are bundled together in a link aggregation group (LAG). The intra-cluster link 28 may provide redundant paths to the network 15 and a control path between the core switches 22.

Each of the periphery switches 24 may be connected to one or both of the core switches 22 via respective physical links. For example, the third periphery switch 24-3 may be connected to the first core switch 22-1 via a first physical link 23-1, and to the second core switch 22-2 via a second physical link 23-2. The physical links 23-1 and 23-2 between the third periphery switch 24-3 and the core switches 22 of the cluster 20 may also be bundled together in a LAG, and provide load sharing and redundancy.

In FIG. 1B and networking system 50 thereof, a cluster 60 may include a group or stack of switches 62-1, 62-2, 62-3 that are interconnected via inter-switch links 68. The stack of switches may be interconnected in a ring configuration, for example. Client devices 66-1, 66-2, and 66-3 may communicate with network 55 (e.g., the Internet) or other upstream devices via a data path that includes one of the stacked switches 62. The inter-switch links 68 may be LAGs that include two or more physical inter-switch links. A first switch 62-1 may be designated as a leader or controller of the cluster 60 to oversee and control operation thereof.

The increasing complexity of computing devices has resulted in two or more components within a computing device operating in unison with one another as well, and this group of components may also be referred to as a cluster. Many modern processing units (e.g., central processing units (CPUs), graphical processing units (GPUs) are implemented on an integrated circuit (IC) chip. Multiple processing cores within a single IC chip (sometimes called "multi-core processors") are becoming increasingly common, and multi-processor systems (that include two or more IC chips each having at least one processing core) are also becoming more common. Parallelization techniques such as hyperthreading have also resulted in a single physical processor core being split into multiple virtual cores, enabling increased usage of the physical core.

Software that operates on computing devices has also become increasingly complex. An exponential increase in processing capabilities has enabled virtualization techniques to be developed been applied to entire computing devices. A single "bare-metal" hardware server may be configured to run several operating systems and execute several applications while maintaining reliability. Virtualization software may create an abstraction layer that enables hardware elements, such as processors, memory, and storage to be divided into multiple system virtual machines (VMs). In full virtualization (or system virtualization), each VM runs its own operating system. To applications and end users, the behavior of a VM is comparable to a dedicated computer. Operating-system level virtualization technologies have also been developed in which application code and its dependencies are bundled together in a single package often called a "container," and are packaged so as to be independent of the operating system. Multiple instances of a single software application or container may be run on one or more physical or virtual machines. These running software instances may have their activity coordinated, and hence may be considered a cluster.

Even within a single computing device, multiple software applications operating in unison may be considered a cluster. Additionally, a software process (e.g., an operating instance of a computer program or of a portion of a computer program) may have one or more threads (sequences of programmed instructions). In some situations, multithreading may enable multiple threads of a software process may be able to be executed in parallel. The different threads of a software process may be executed by a single core (physical or virtual) or may be executed by different cores, and the different threads may share a common memory or address space to store and exchange information between the threads. As such, multiple threads of a single software process, or the multiple software processes of a computer program, may also be considered a cluster. For example, in FIG. 1C and computing device 80 thereof, a processor unit 82 may include physical cores 83-1 and 83-2, each of which may be divided into virtual cores 84-1 to 84-4. A memory 85 storing a computer program 86 may be coupled to the processor unit 82 and the physical and virtual cores thereof. The computer program 86 may be read from the memory 85 and a process may be instantiated. The process may spawn a cluster 90 of multiple threads 91-1 to 91-4 which in some embodiments may be assigned respectively to each of the virtual cores 84-1 to 84-4 for processing (while in other embodiments all of the multiple threads 91 may be assigned to a subset of the virtual cores 84). Additionally or alternatively, the computer program 86 may be read from the memory 85 and a cluster 90 of multiple processes 91 may be instantiated. The instantiated processes 91 may in some embodiments be assigned respectively to each of the virtual cores 84-1 to 84-4 for processing (while in other embodiments all of the multiple processes 91 may be assigned to a subset of the virtual cores 84).

The increasingly complex networking systems, computing devices, and software discussed herein require increasingly complex management and consideration of software development and deployment. As these networks, hardware, and software grow in complexity, development agility and deployment agility are reduced, and the time spent in a development cycle of implementing features, testing features and compatibility, identifying issues, and correcting the identified issues increases exponentially. For example, as an application grows in complexity and code base size, it may be split into multiple components managed by different software developers and/or functional teams. Some organizations are also implementing microservices-based architectures, in which individual business logic components are implemented as separate services (or microservices) that communicate using a standard typically lightweight protocol, such as a REST (representational state transfer) API (application programming interface).

Regardless of the software model used, features of the application may extend across different components and therefore require an interface between the different components, and diagnosing or debugging issues of these features not only requires each team to test their individual components, but also to coordinate to test the interface between the components. In other words, two software or hardware components that communicate with one another result in at least three sources of potential problems or issues: the components themselves and the communication channel therebetween. Not only are diagnosing and debugging such issues difficult, but disastrous results can also arise if issues are not detected. A somewhat famous example of this is the Mars Climate Orbiter, which catastrophically malfunctioned on its approach to the planet Mars because two software systems maintained by two different teams respectively produced and expected thruster values in different units (metric and non-metric).

One common way to diagnose and debug issues present within a computing device or networking system is to review a state representation of the device or system that reflects a status of the device or system when the software or hardware issue occurred. These state representations can include memory or core dumps that indicates the contents of a memory location or of the entire system memory, although these are typically generated only when a software program terminates unexpectedly. Another state representation is a log file or log database, which can be generated and/or written to based on different triggers, including those during normal operation of the software program. For example, a computer program may be configured to write to a log file or logging database when a password is entered (correctly or incorrectly), when a web service can no longer be reached, when a peer switch is enabled, or when any one of countless triggers occurs. In some situations, developers use triggers in the form of "print-to-log" commands that are directly inserted into source code to indicate a device state or status during execution of a software program.

Typically, an entry in a log file or log database includes a timestamp indicating when the entry was written to the log file or log database, as well as developer-specified details regarding the state of the system or device at the time the entry was made. The amount and type of information of the details, and even whether to write to the log file or log database, may be adjustable in some situations; for example, a production environment serving users may capture different information in its log files than a development environment used for debugging and diagnosing hardware and software issues.

Although log files and log databases are useful in some situations, the increasing complexity of inter-thread, inter-process, inter-program, and inter-device environments has resulted in difficult to parse and diagnose log files. For example, consider the networking system 10 of FIG. 1A above, and a relatively simplistic example of a stream of data packets moving from the third client device 26-3 to the network 15. In this simplistic example, each periphery switch 24 and each core switch 22 of the cluster 20 is configured to record timestamps and information about each packet that passes through the periphery switch 24 or core switch 22. In a situation where packets are lost between the client device 26-3 and the network 15, a software developer or network engineer would need to review log files for the third periphery switch 24-3, as well as both core switches 22 of the cluster 20, because the third periphery switch 24-3 may have sent the packet to either the first core switch 22-1 or the second core switch 22-2 via links 23-1 or 23-2, or because the first core switch 22-1 or the second core switch 22-2 that received the packet from the third periphery switch 24-3 may have sent the packet to the other core switch 22 due to load balancing, link failure, and/or another reason.

Complicating matters, the first core switch 22-1 or the second core switch 22-2 may be processing traffic from the other client devices 26 while the packets are lost between the client device 26-3 and the network 15, and there may be a large number of entries in the log of the first core switch 22-1 or the second core switch 22-2 in the time period when the packets were lost. The software developer or network engineer may need to review a large number of less relevant or less useful entries to pinpoint where the issue occurred. In some instances, timestamps may not be available, either because the timestamp information is not recorded in the log, or because the issue occurs prior to clock synchronization of the devices of the networking system.

To address the above and other issues, the present disclosure proposes a transaction-based messaging and logging infrastructure. Herein, a transaction may be an indivisible sequence of operations. The sequence of operations may be at least two operations, or in other words a plurality of operations. A transaction may be initiated by a triggering event, examples of which are discussed below. A unique transaction identifier may be generated and associated with each transaction that spans multiple threads, processes, programs, and/or devices. The transaction identifier may be communicated among to the multiple threads, processes, programs, and/or devices via an inter-thread/inter-process/inter-program/inter-device message sent by a first unit of a multi-unit system that executes a first operation of the transaction, and then used or re-used by a second or subsequent unit executing a second or subsequent operation. The first and second units of the multi-unit system may use the transaction identifier when logging information related to the execution of the operations. Herein, the term unit is used as a generic reference to a thread, process, program, device, and so on. For example, first and second threads of a multi-threaded system may be considered first and second units of a multi-unit system, first and second switches of a cluster of stacked switches may be considered first and second units of a multi-unit system, and so on. As another example, first and second software processes may be considered first and second units of a multi-unit system, even if operated by a single processor (e.g., a single physical CPU or virtual CPU). A multi-unit system may also be referred to as a cluster.

The transaction-based messaging and logging infrastructure and transaction identifier proposed herein may improve and facilitate software development and deployment. For example, the infrastructure may improve troubleshooting and debugging for issues that are difficult to diagnose a root cause thereof, which may reduce a mean time to recovery (MTTR). The infrastructure may enable any entry in a log, such as a log file or log database, to be tracked to the originating triggering event using the generated and associated transaction identifier. Similarly, different logs associated with different operations that resulted from a single triggering event can be aggregated, filtered, and/or viewed using the common generated transaction identifier, because the transaction identifier would be same in each of the different logs.

The transaction-based messaging and logging infrastructure and transaction identifier proposed herein may also improve the operation of systems that include computing devices and networking devices, because the devices themselves may be able to identify issues with inter-thread/inter-process/inter-program/inter-device transactions using the transaction identifier and perform corrective actions regarding the same. As another example, the transaction identifier may enable the computing devices and networking devices to be configured to identify a transaction for a given operation, which can be extended or exposed to create, read, update, and delete operations that correlate and synchronize data.

Figure 2:
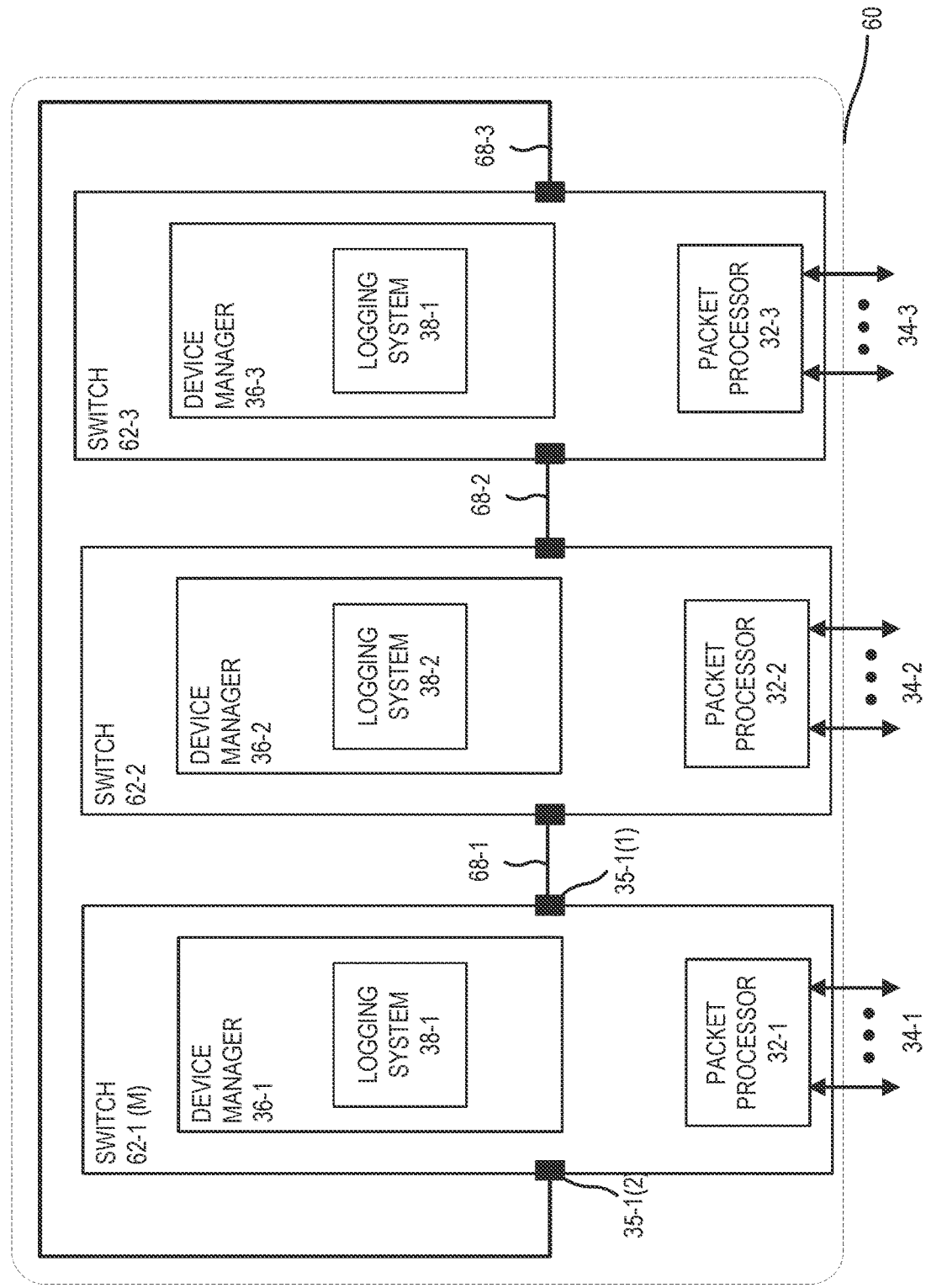
FIG. 2 is a block diagram of aspects of the networking system of FIG. 1B in greater detail in accordance with embodiments of the present disclosure.

FIG. 2 is a block diagram of aspects of the networking system of FIG. 1B in greater detail in accordance with embodiments of the present disclosure. FIG. 3 shows the switches 62 of the cluster 60 in greater detail, with the understanding that aspects described with respect to the switches 62 of the cluster 60 may be implemented in e.g., the core switch 22 or periphery switch 24 of FIG. 1A or the computing device 80 of FIG. 1C.

Each switch 62 may include a number of communication ports 34, and other computing devices (e.g., client devices 66) may be connected to one or more of the communication ports 34. At least one switch 62 may be coupled to a network 55 also via the one or more communication ports 34. The switches 62 may be interconnected via the inter-switch links 68 that are coupled to stacking ports or device-to-device ports 35 of each switch 62.

Each switch 62 may also include a packet processor 32, which may facilitate forwarding of packets between the connected computing devices connected to the cluster 60 of switches 62. As an example, each packet processor 32 may include a hardware routing engine and hardware routing table implemented using a hardware-based memory component, such as a ternary content-addressable memory (TCAM) or other similar associative memory. These hardware components can enable faster table lookups. A software routing table may also be present within each switch 62 that may include a greater number of entries than the hardware routing table, albeit at the expense of increased time to perform table lookups.

Each switch 62 may also have a respective device manager 36. The device manager 36 can be implemented in hardware and/or in software. In some embodiments, a device manager 36 can be embodied in computer-executable instructions stored in a memory which is coupled to one or more processors (e.g., management CPUs) present in the switch 62. When executed, these instructions cause the processor(s) to perform the functionality of the device manager 36. Some or all of the functionality described with reference to the device manager 36, may be provided within a single (e.g., "monolithic") set of computer-executable instructions, or segmented into two, three, four, or more than four sets of computer-executable instructions. The device manager 36 may be configured to control operations of the switch 62 and/or perform operations not handled by the packet processor 32.

In some embodiments, one of the switches 62 may be designated to act as a leader or master of the cluster 60, and in the block diagram of FIG. 3, first switch 62-1 has been so designated (as seen by the letter (M)). The leader of the cluster 60 may administer and manages operations of the cluster 60 and the switches 62 thereof. For example, the leader may be configured to enable administration of the switches 62 through a common interface (e.g., a common user interface or administrative dashboard). The leader can accept and process user commands directed to the overall configuration of the cluster 60, and the leader can also communicate with the non-leader (or follower) switches of the cluster 60 as needed in order to propagate various types of management commands and data to those switches. The commands may be provided The leader may also be configured to support or provide functionality that facilitates network configuration, monitoring, provisioning, discovery, planning, troubleshooting, performance management, security, and reporting, as examples. In some embodiments, all or a portion of the functionality of the described leader may be instead provided within each switch 62.

Each switch 62 may also include a logging system 38, which may be configured to generate and record entries and store the same in a log. The entries may be stored, for example, a log file or log database stored in a memory location within the respective switch 62, or the log may be a log file or log database stored at a location other than the respective switch 62, e.g., the leader switch 62-1, a follower switch 62-2 or 62-3, a location in network 55, and/or a client device 66, as examples. Entries may be stored in one or more logs. Although the logging system 38 is showed within the device manager 36, it is to be understood that in some embodiments, the logging system may be elsewhere in the switch 62.

The logging system 38 may be configured to generate unique transaction identifiers for each transaction (e.g., each indivisible sequence of operations) that different operations thereof will be executed by different units of a multi-unit system. In some embodiments, the logging system 38 may be configured to generate unique transaction identifiers for each transaction, even if only one units of a multi-unit or single-unit system executes the operations of the transaction.

A transaction may be initiated by a triggering event, and accordingly a transaction identifier may be generated by a logging system 38 responsive to the triggering event. For example, the leader of the cluster 60 may receive input through the common interface (e.g., a common user interface or administrative dashboard) in the form of user commands. These commands may be entered via a command-line interface or other input mechanism (e.g., Network Configuration Protocol or NETCONF, RESTConf, Simple Network Management Protocol or SNMP, a web-based user interface such as WebUI, or so on). The leader can accept and process these user commands directed to the overall configuration of the cluster 60, and the leader can also communicate with the non-leader (or follower) switches of the cluster 60 as needed in order to propagate various types of management commands and data to those switches. The present disclosure is not limited to particular types of triggering events that initiate transactions. For example, statuses of packets in the cluster 60, states of queues handling such packets (e.g., being empty or full), expirations of timers, interrupt signals, and other events may be triggering events that initiate transactions and that trigger generation of a transaction identifier by a logging system 38.

Each unit of the cluster 60 or a component thereof (e.g., the device manager 36, the logging system 38) may be configured to cause a message to be transmitted that includes a generated transaction identifier. The message may be transmitted from a first unit of the multi-unit system to a second or subsequent unit of the multi-unit system, and hence the message may be referred to as an inter-unit message. In addition to the generated transaction identifier, the message may include a command, request, instruction, response, or other information to be communicated from the first unit of the multi-unit system to the second or subsequent unit of the multi-unit system.

Additionally, each unit of the cluster 60 or a component thereof (e.g., the device manager 36, the logging system 38) may be configured to receive an inter-unit message from a different unit of the cluster 60 or a component thereof (e.g., the device manager 36, the logging system 38) that includes a generated transaction identifier. The message may be transmitted from a first unit of the multi-unit system to a second or subsequent unit of the multi-unit system, and use the received transaction identifier when logging information to execution of an operation associated with the received message (e.g., processing the command, request, instruction, response, or other information within the message, performing an operation of the transaction, initiating a second transaction, or so on). Each unit of the cluster 60 or a component thereof (e.g., the device manager 36, the logging system 38) may be configured to store transaction identifiers generated by the respective unit of the cluster 60 or received from a different unit of the cluster 60 in a memory store.

Figure 3A:
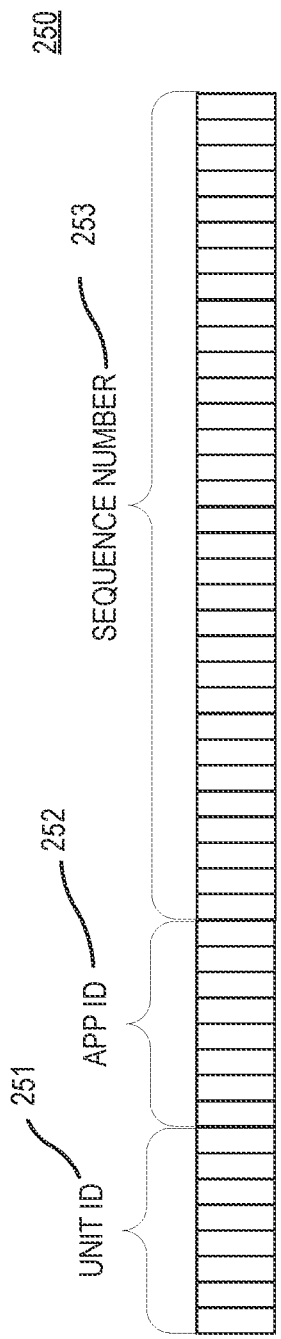
FIGS. 3A and 3B are diagrams of aspects of transaction identifiers in accordance with embodiments of the present disclosure.
Figure 3B:
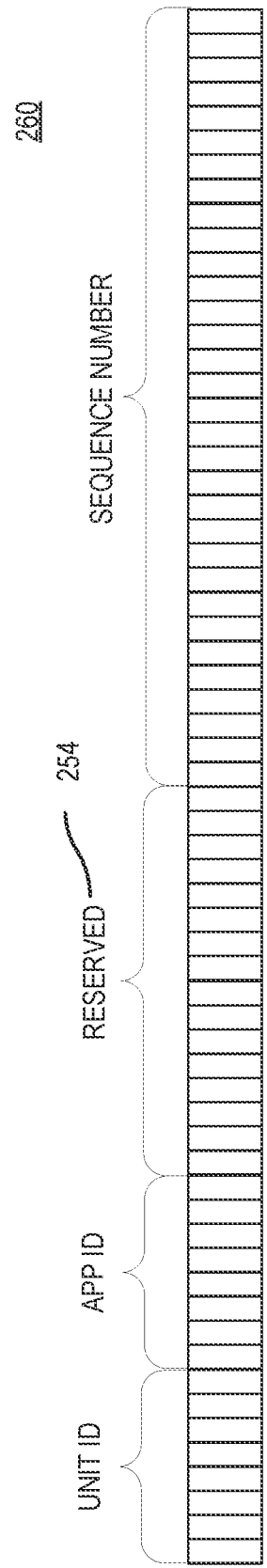

FIGS. 3A and 3B are diagrams of aspects of transaction identifiers in accordance with embodiments of the present disclosure. FIG. 3A illustrates a first example of a transaction identifier 250 comprising 48 bits, and FIG. 3B illustrates a second example of a transaction identifier 260 comprising 64 bits. The number of bits of the transaction identifier 250 of FIG. 3A and of the transaction identifier 260 of FIG. 3B and of the fields thereof may be implementation-specific, and in some embodiments different numbers of bits may be chosen. Both the transaction identifier 250 of FIG. 3A and of the transaction identifier 260 of FIG. 3B include a unit identifier field 251, application identifier field 252, and sequence number field 253.

The unit identifier field 251 may indicate the unit (e.g., the switch, thread, process, program, or device) of the multi-unit system that initiated the transaction (e.g., the indivisible sequence of operations). The application identifier field 252 may indicate the software application (e.g., the thread, process, or program) that initiated the transaction. In some embodiments, for example where the units of the multi-unit system are applications, one or the other of the unit identifier field 251 and the application identifier field 252 may be omitted. The sequence number field 253 may be a rolling counter that increments by one for each transaction initiated by a unit/application set. For example, a first transaction initiated by a first unit/application set may be assigned a first sequence number, and a second transaction initiated by the first unit/application set after the initiation of the first transaction may be assigned a second sequence number. A third transaction initiated by a second unit/application set may be assigned the first sequence number, and a fourth transaction initiated by the second unit/application set after the initiation of the third transaction may be assigned the second sequence number. Note that the first unit/application set and second unit/application set may have one or the other of a common unit (e.g., an identical value in the unit identifier field 251) or a common application (e.g., an identical value in the application identifier field 252). In some embodiments, the sequence number field 253 may be incremented for each transaction initiated by the unit.

In some embodiments, the unit identifier field 251 may be 8 bits (1 byte), the application identifier field 252 may be 8 bits (1 byte), and the sequence number field 253 may be 32 bits (4 bytes), although the present disclosure is not limited thereto and different lengths for each may be selected according to the number of units within the multi-unit system or cluster, the number of applications that may run on each unit, and/or the number of transactions initiated by each unit and/or application. The selection of lengths for the unit identifier field 251, application identifier field 252 and/or sequence identifier field 253 may also be dependent on an amount of time needed before the sequence identifier field 253 "rolls over" (e.g., a value to be stored in the sequence identifier field 253 would exceed the maximum value that can be represented by the length of the field, and the rolling counter should be reset to the maximum value that can be represented by the length of the field, or to zero).

The transaction identifier 260 of FIG. 3B differs from the transaction identifier 250 of FIG. 3A by including a reserved field 254, which may be used as a placeholder of bits to extend the lengths of the unit identifier field 251, the application identifier field 252, and/or the sequence number field 253 without requiring reallocation and reconfiguration of memory devices that store the transaction identifier 260 of FIG. 3B. In the example shown in FIG. 3B, the reserved field may be 16 bits (2 bytes) although the present disclosure is not limited thereto. Additionally and/or alternatively, the reserved field 254 may be used to communicate additional information to other components within the multi-component system.

Figure 4:
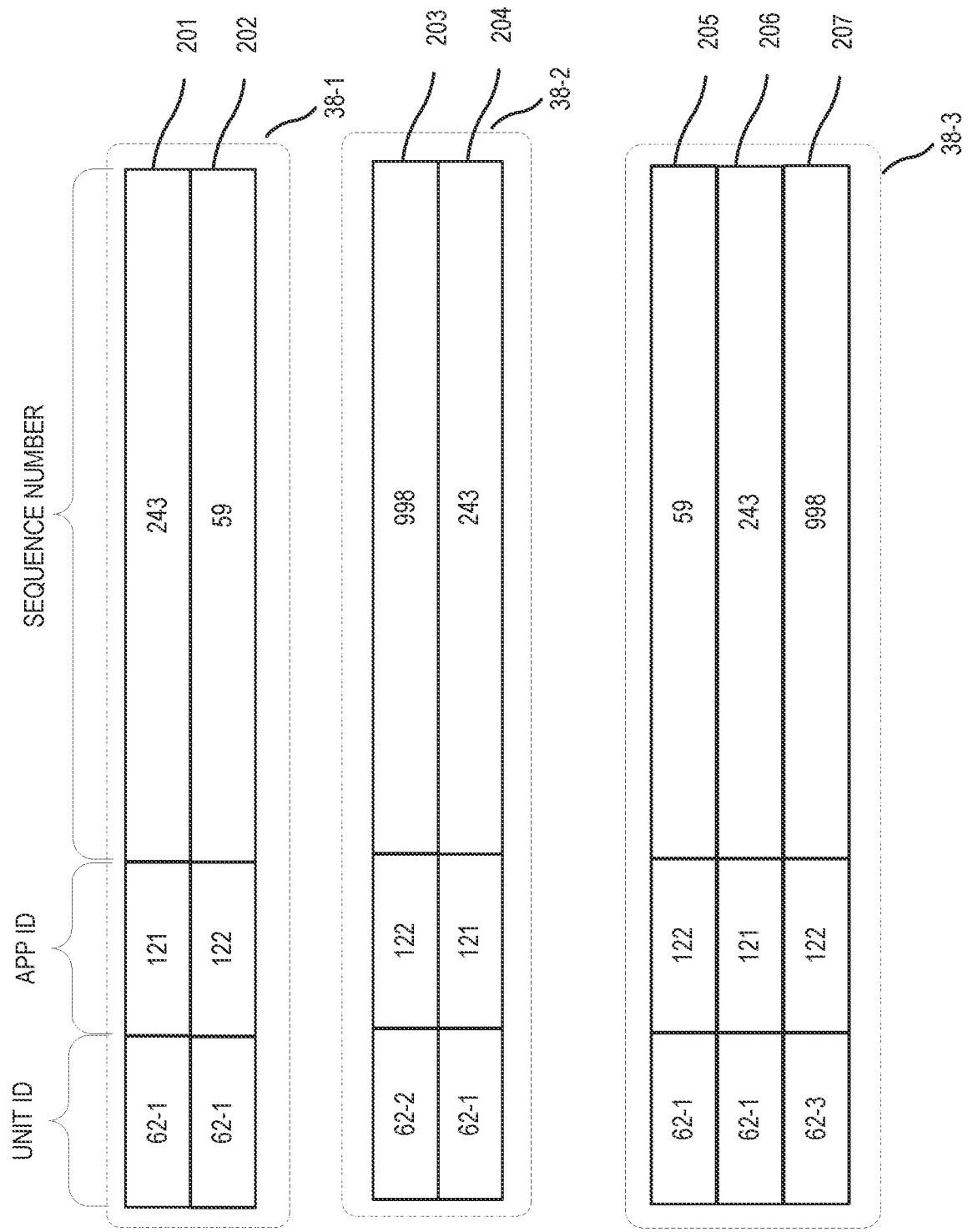
FIG. 4 is an example of transaction identifiers that are generated in the devices of the networking system of FIG. 1B and FIG. 2 in accordance with embodiments of the present disclosure.

FIG. 4 is an example of transaction identifiers that are generated in the devices of the networking system of FIG. 1B and FIG. 2 in accordance with embodiments of the present disclosure.

FIG. 4 illustrates transaction identifiers 201-207 generated/and or recorded by each logging system 38 of FIG. 2 (e.g., a first logging system 38-1 of the first switch 62-1, a second logging system 38-1 of the second switch 62-2, and a third logging system 38-1 of the third switch 62-1. The transaction identifiers 201-207 illustrated in FIG. 4 may be parts of log entries that are recorded by the logging systems 38 in respective logs associated therewith, although in some embodiments the log entries may be aggregated in a super-log associated with the cluster 60. These log entries may include information from the application that is to be logged (e.g., information regarding the event triggering the recordation of the entry in the log), timestamp information, or other information. One or more of these omitted fields may be present in the full log entries that correspond to the transaction identifiers 201-207 shown in FIG. 4. Note also that, for a given transaction, multiple log entries may be recorded in the logs of the switches 62 or the cluster 60, with each log entry associated with an operation of the transaction. The set of events triggering the recordation of the entry in the log may overlap the set of events triggering the initiation of a transaction, but each of these sets of events may include events not found in the other set.

As can be seen in FIG. 4, transaction identifier 201 may be generated as the result of an event occurring at the first switch 62-1 (e.g., the first unit of the multi-unit system 60) during the execution of a first application 121 by the first switch 62-1. The event occurring at the first switch may be the 243$^{rd}$ in a sequence of transactions initiated during the execution of the first application 121 by the first switch 62-1, indicated by the sequence number 243 in the sequence number field. The triggering event may be, for example, the receiving of user input indicating a configuration change of the cluster 60, and the initiated transaction may be, for example, the generation and transmission of configuration commands from the leader switch of the cluster 60 (the first switch 62-1) to the other switches of the cluster 60. The logging system 38-1 of the first switch 62-1 may cause the transaction identifier 201 to be included in a message transmitted from the first switch 62-1 to the other switches of the cluster 60, and the logging system 38-2 of the second switch 62-2 and the logging system 38-3 of the third switch 62-3 may store the received transaction identifiers in their respective memory stores. In FIG. 4, transaction identifiers 204 and 206 are these locally-stored instances of transaction identifier 201.

Similarly, transaction identifier 202 may be generated as the result of an event occurring at the first switch 62-1 (e.g., the first unit of the multi-unit system 60) during the execution of a second application 122 by the first switch 62-1. The event occurring at the first switch may be the 59$^{th}$ in a sequence of transactions initiated during the execution of the second application 122 by the first switch 62-1, indicated by the sequence number 59 in the sequence number field. The logging system 38-1 of the first switch 62-1 may cause the transaction identifier 202 to be included in a message transmitted from the first switch 62-1 to only the third switch 62-3 of the cluster 60, and the logging system logging system 38-3 of the third switch 62-3 may store the received transaction identifier in its respective memory stores. In FIG. 4, transaction identifier 205 is the locally-stored instance of transaction identifier 202.

Instances of the second application 122 may also be executed by the second switch 62-2 and the third switch 62-3. Events triggering transaction initiation may occur during the execution of the second application at the second switch 62-2 and third switch 62-3. As seen from transaction identifiers 202, 203, 205, and 207, even though the second application 122 is executed by all three switches 62-1, 62-2, and 62-3 and transactions are resulting therefrom, different unit identifiers in the unit identifier field 251 and/or different sequence numbers in the sequence number field 253 enable the transactions to be distinguished based on different transaction identifiers. For example, the transaction identifiers 205 and 207 stored in the memory store of the third switch 62-3 may be distinguished based on their different unit identifiers and different sequence numbers, and transaction identifiers 203 and 207 stored respectively in the memory store of the second switch 62-2 and the third switch 62-3 may be distinguished based on their different unit identifiers, despite having the same sequence number.

Figure 5:
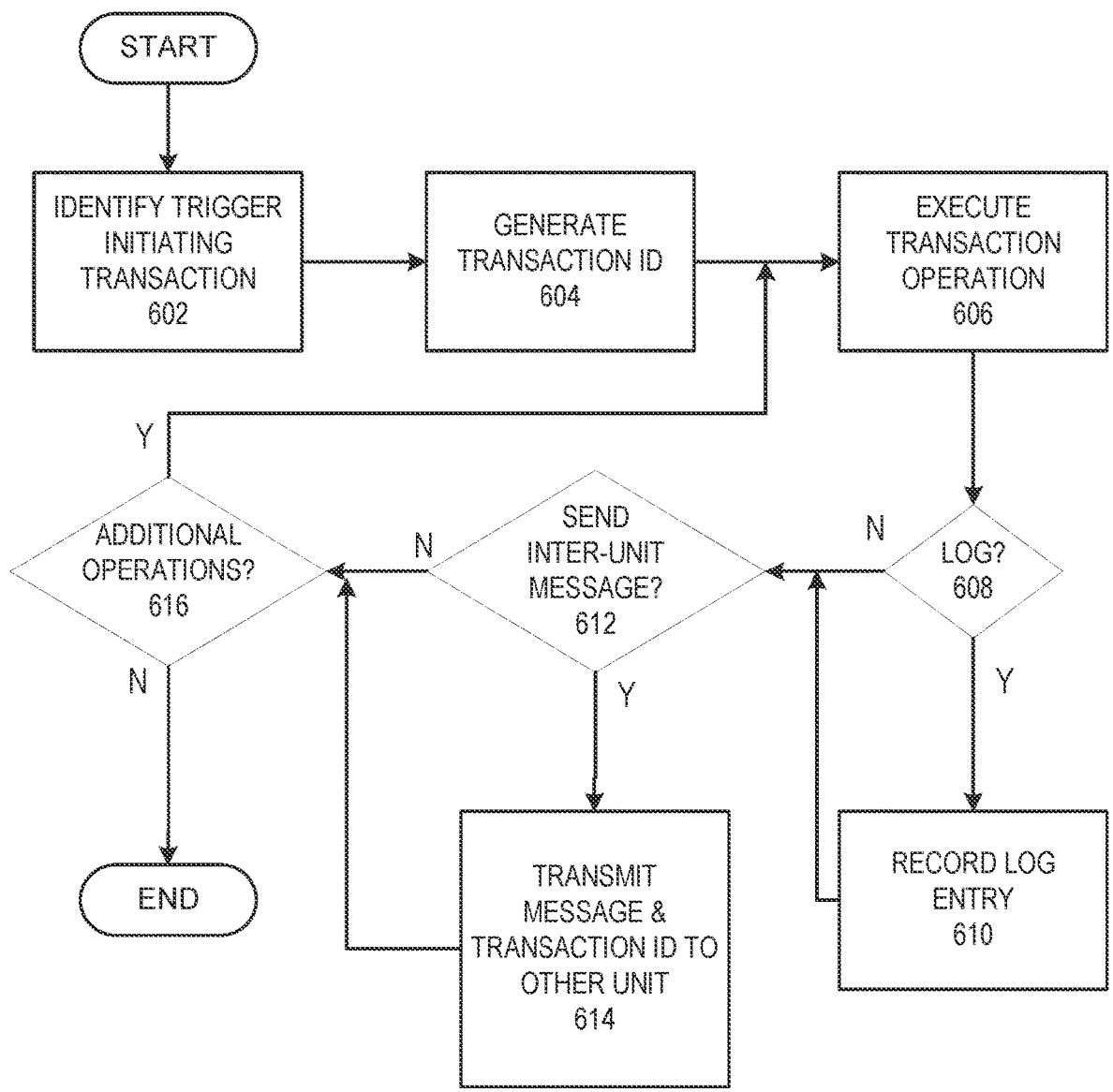
FIGS. 5 and 6 are flowcharts of operations of generating and transmitting messages using transaction identifiers in accordance with embodiments of the present disclosure.
Figure 6:
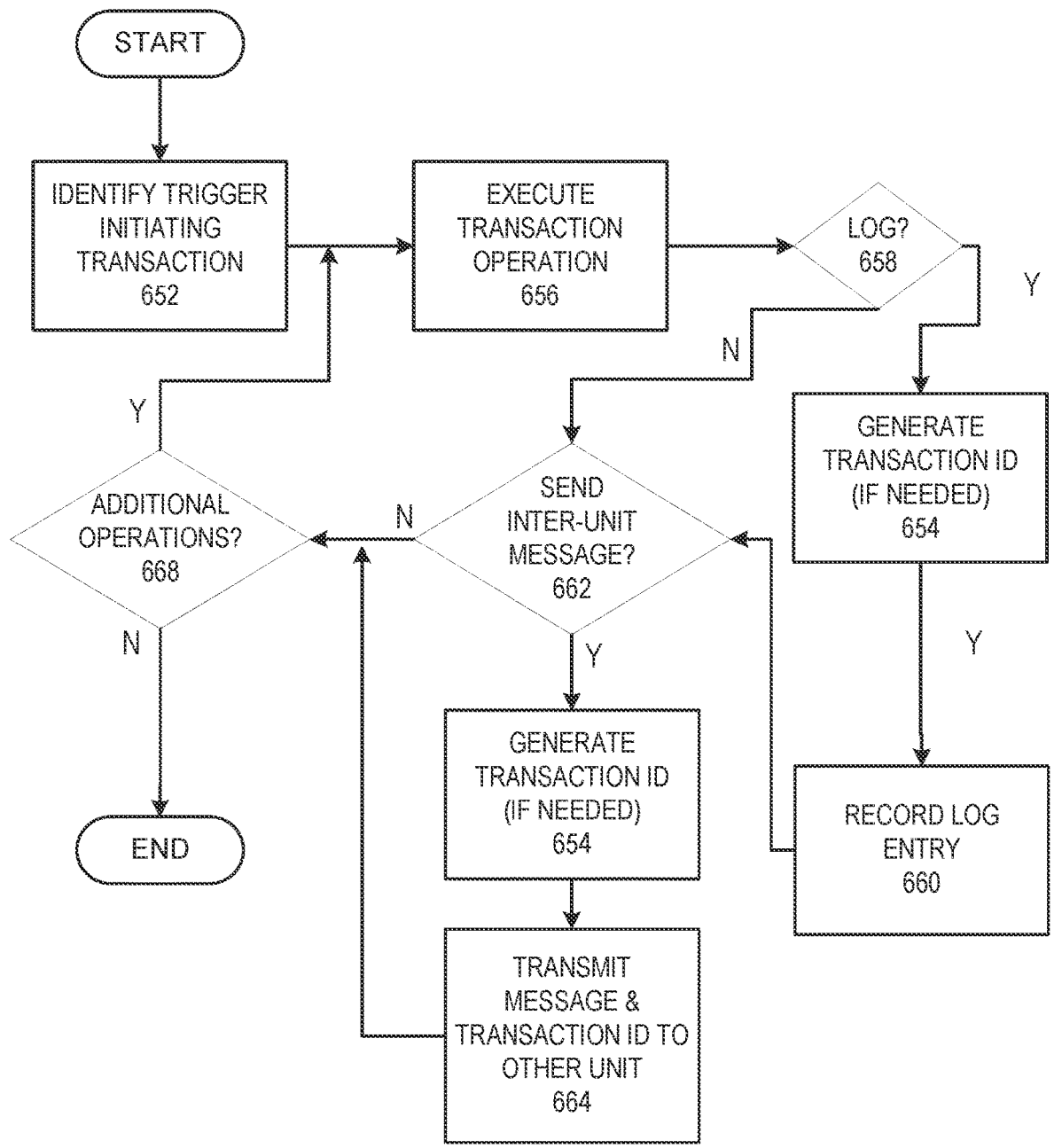

FIGS. 5 and 6 are flowcharts of operations of generating and transmitting messages using transaction identifiers in accordance with embodiments of the present disclosure. In flowchart 600, an event triggering initiation of a transaction may be identified (block 602). As discussed above, there is no limitation on the types of events that may initiate a transaction, although examples may include receiving user input, receiving signals indicating a status of a packet or of a queue handling such packets, identifying a timer has expired, receiving an interrupt signal, and so on. The logging system 38 may identify the event triggering initiation of the transaction based on receiving a signal or parameter indicating the event, receiving a signal or parameter indicating a transaction has been initiated, or polling a process, thread, and/or memory location to identify a triggering event has occurred and/or a transaction has been initiated.

Based on the identified event trigger or identified initiated transaction, the logging system 38 may generate a transaction identifier (block 604). In some embodiments, this may include identifying or retrieving a unit identifier for insertion into the unit identifier field 251, identifying or retrieving an application identifier for insertion into the application identifier field 252. Generating the transaction identifier may also include incrementing a sequence counter associated with both the unit identifier and the application identifier for insertion into the sequence number field 253.

An operation of the transaction may be executed by the unit (block 606). During or after the operation of the transaction, the logging system 38 may detect whether a log entry is to be generated recorded to a log (block 608). The logging system 38 may detect whether the log entry is to be generated and recorded to the log based on receiving a command or instruction from the executing unit or application (e.g., a function call) and/or based on a configuration of the unit, application, or logging system 38. If the log is to be generated and recorded to the log ("Y" branch from block 608), the log entry is generated and recorded (block 610). Generating the log entry and recording the generated log entry in the log may include retrieving a previously-generated transaction identifier (generated in block 604) from a memory store for recordation as part of the log entry.

After the log entry is generated and recorded to the log, or if no log entry is generated and recorded to the log ("N" branch from block 608), the logging system 38 and/or executing application or unit may detect whether an inter-unit message is to be sent as part of the transaction (block 612). For example, a transaction may include a leader switch 62-1 communicating messages to follower switches of the cluster 60 as needed in order to propagate various types of management commands and data to those switches. If an inter-unit message is to be sent ("Y" branch from block 612), an inter-unit message including the transaction identifier may be sent from the unit to the other unit (block 614). Sending the inter-unit message may include retrieving a previously-generated transaction identifier (generated in block 604) from a memory store for recordation as part of the log entry.

In some embodiments, the transaction identifier may be sent to the other unit only once while in other embodiments, the transaction identifier may be sent to the other unit multiple times. The inter-unit message including the transaction identifier may also include the command, instruction, request, response, and/or information that is part of the execution of the transaction, or the inter-unit message including the transaction identifier may be a separate inter-unit message.

After the inter-unit message including the transaction identifier is generated and transmitted, or if no inter-unit message including the transaction identifier is generated and transmitted ("N" branch from block 612), the logging system 38 and/or executing application or unit may detect whether additional operations of the transaction remain to be performed (block 616) and either perform the additional operations by looping back to block 606 ("Y" branch from block 616) or concluding ("N" branch from block 616), which may include concluding the transaction.

The flowchart 650 of FIG. 6 is similar to the flowchart 600 of FIG. 5, except that initial generation of the transaction identifier may be delayed until needed, e.g., when a log entry is to be generated and recorded in a log (blocks 658, 654, and 660), and/or when an inter-unit message is to be generated and transmitted (blocks 662, 654, and 664). Blocks 652, 656, 658, 660, 662, 664, and 668 of FIG. 6 may be respectively similar to blocks 602, 606, 608, 610, 612, 614, and 616 of FIG. 5 and description of the similar blocks of FIG. 6 is omitted herein in favor of a reference to the above description of the blocks of FIG. 5. The flowchart 650 of FIG. 6 may be preferred to the flowchart 600 of FIG. 5 in that, in some situations, the flowchart 600 may result in a transaction identifier being generated (and thus incrementing a sequence counter) even though the transaction identifier is neither recorded in the log or sent in the inter-unit message, which may result in a "missed" transaction identifier.

Figure 7:
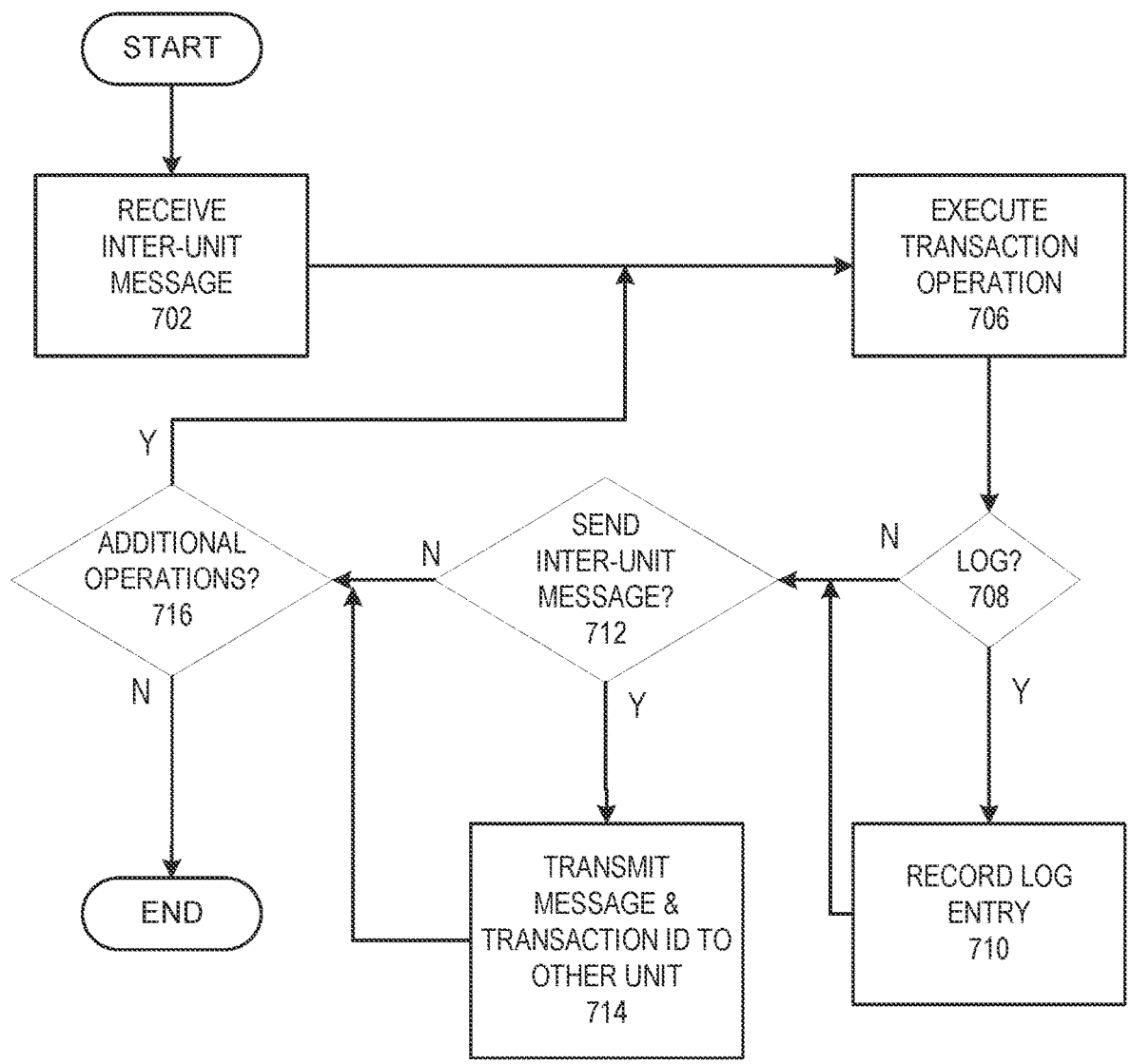
FIG. 7 is a flowchart of operations of receiving messages that include transaction identifiers in accordance with embodiments of the present disclosure.

FIG. 7 is a flowchart of operations of receiving messages that include transaction identifiers in accordance with embodiments of the present disclosure. It may be seen that, other than receiving the inter-unit message (block 702), flowchart 700 is similar to flowchart 600 of FIG. 5. Receiving the inter-unit message (block 702) may include receiving the inter-unit message that includes the transaction identifier and/or the inter-unit message indicating the operations of the transaction to be performed by the receiving unit. Blocks 706, 708, 710, 712, 714, and 716 of FIG. 7 may be respectively similar to blocks 606, 608, 610, 612, 614, and 616 of FIG. 5 and description of the similar blocks of FIG. 7 is omitted herein in favor of a reference to the above description of the blocks of FIG. 5.

Figure 8:
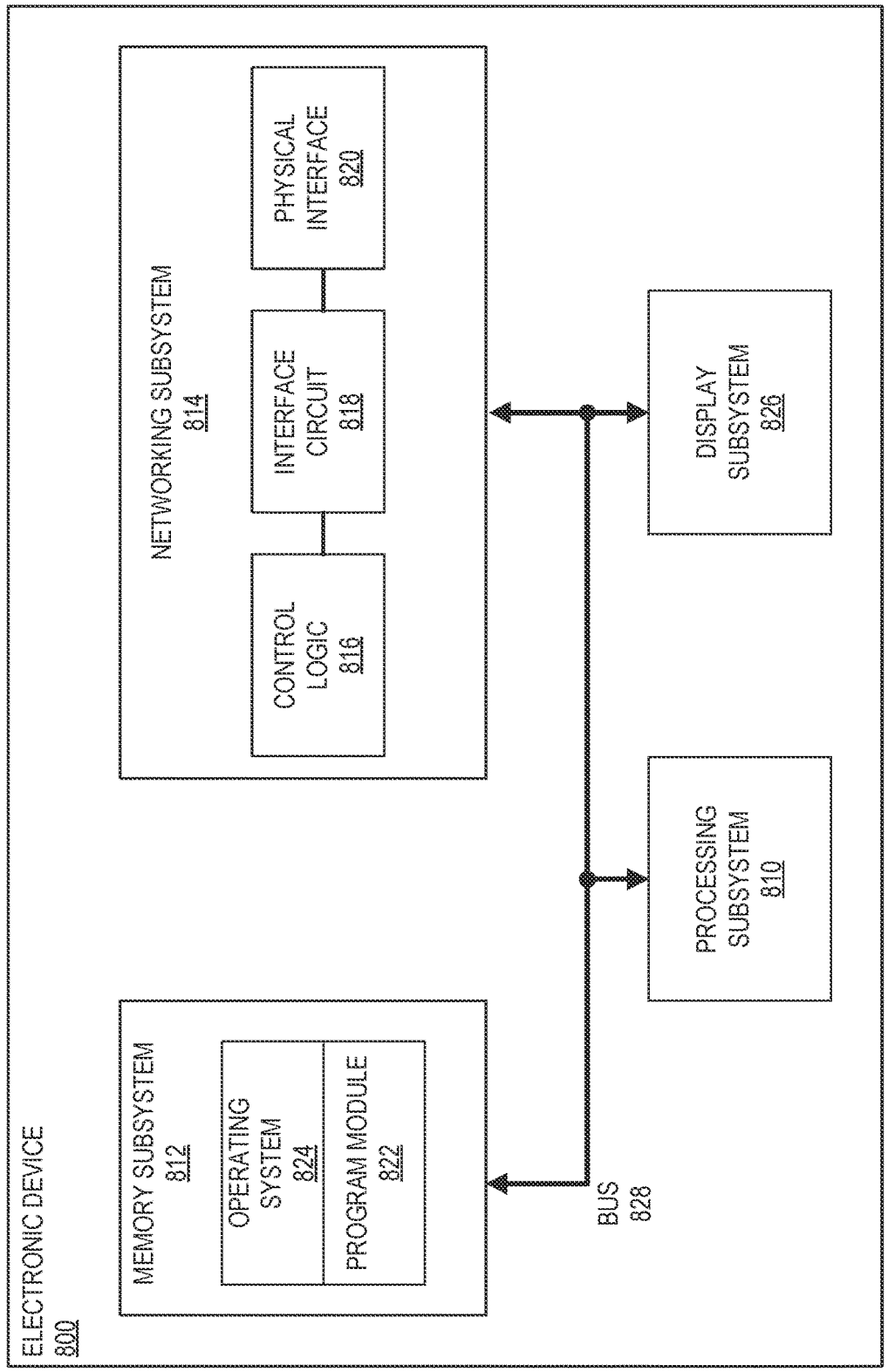
FIG. 8 is a block diagram of a computing device in accordance with embodiments of the present disclosure.

FIG. 8 is a block diagram of a computing device 800 in accordance with embodiments of the present disclosure. Aspects or components of the computing device 800 may be present in the various computing devices described herein (e.g., the switches and client devices of FIGS. 1A and 1B, the computing device of FIG. 1C, and so on). The computing device 800 may include a processing subsystem 810, a memory subsystem 812, and a networking subsystem 814.

The processing subsystem 810 may include one or more devices configured to perform computational operations. For example, the processing subsystem 810 can include one or more microprocessors, ASICs, microcontrollers, programmable-logic devices, and/or one or more digital signal processors (DSPs,).

The memory subsystem 812 may include one or more devices for storing data and/or instructions for the processing subsystem 810 and/or the networking subsystem 814. For example, the memory subsystem 812 can include dynamic random-access memory (DRAM), static random-access memory (SRAM), and/or other types of memory. In some example embodiments, instructions for the processing subsystem 810 stored in the memory subsystem 812 include: one or more program modules or sets of instructions (such as a program module 822 or an operating system 824), which may be executed by the processing subsystem 810. Note that the one or more computer programs may constitute a computer-program mechanism. In some embodiments, the memory subsystem 812 may be coupled to or may include one or more storage devices (not shown). For example, the memory subsystem 812 can be coupled to a magnetic or optical drive, a solid-state drive, or another type of mass-storage device. In these embodiments, the memory subsystem 812 can be used by the computing device 800 as fast-access storage for often-used data, while the storage device is used to store less frequently used data.

The networking subsystem 814 may include one or more devices configured to couple to and communicate on a wired and/or wireless network (i.e., to perform network operations), including: control logic 816, an interface circuit 818 and one or more interfaces 820 (e.g., ports, antennas, antenna elements). For example, the networking subsystem 814 can include an Ethernet networking system, a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), and/or another networking system. The networking subsystem 814 may include processors, controllers, radios/antennas, sockets/plugs, and/or other devices used for establishing a connection using each supported networking system, coupling to each supported networking system, communicating on each supported networking system, and handling data and events for each supported networking system. Note that mechanisms used for establishing connections, coupling to networks, communicating on networks, and handling data and events on the network for each network system are sometimes collectively referred to as a 'network interface' for the network system.

Within a computing device 800, the processing subsystem 810, the memory subsystem 812, and the networking subsystem 814 may be coupled together using a bus 828. The bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, the computing device 800 may include a display subsystem 826 for displaying information on a display (not shown), which may include a display driver and the display, such as a liquid-crystal display, a multi-touch touchscreen, etc.

The computing device 800 can be (or can be included in) any electronic device with at least one network interface. For example, the computing device 800 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a controller, a router, a switch, communication equipment, test equipment, and/or another electronic device.

Although specific components are used to describe the computing device 800, in some example embodiments, different components and/or subsystems may be present in the computing device 800. For example, the computing device 800 may include one or more additional processing subsystems, memory subsystems, networking subsystems, and/or display subsystems. Additionally, one or more of the subsystems may not be present in an example computing device 800. Moreover, in some embodiments, the computing device 800 may include one or more additional subsystems that are not shown in FIG. 8. Also, although separate subsystems are shown in FIG. 8, in some embodiments some or all of a given subsystem or component can be integrated into one or more of the other subsystems or component(s) in a computing device 800. For example, in some embodiments the program module 822 may be included in the operating system 824 and/or the control logic 816 may be included in the interface circuit 818.

The foregoing descriptions of embodiments of the present disclosure have been presented for purposes of illustration and description only. They are not intended to be exhaustive or to limit the present disclosure to the forms disclosed. Accordingly, many modifications and variations of the inventive concepts will be apparent to those skilled in the art, and the inventive concepts defined herein may have applicability to other embodiments and applications without departing from the scope of the present disclosure.

What is claimed is:

1. A method comprising:
   identifying, by a first unit of a multi-unit system of computing devices, that an event has occurred that triggers initiation of a transaction, wherein the transaction comprises a sequence of operations, with at least one operation of the sequence of operations to be executed by the first unit and at least one operation of the sequence of operations to be executed by a second unit of the multi-unit system;
   generating, by the first unit, a transaction identifier associated with the transaction, the transaction identifier comprising a unit identifier of the first unit and an application identifier of an application associated with the event; and
   transmitting, from the first unit and to the second unit of the multi-unit system, the transaction identifier as part of an inter-unit message.

2. The method of claim 1, further comprising:
   recording, by the first unit or the second unit and in a log, a log entry comprising the transaction identifier.

3. The method of claim 1, further comprising:
   recording, by the first unit and in a first log associated with the first unit, a log entry comprising the transaction identifier; and
   recording, by the second unit and in a second log associated with the second unit, a log entry comprising the transaction identifier.

4. The method of claim 3, wherein each of the first log and second log are a log file or log database.

5. The method of claim 1, wherein the first unit and second unit are each switches in a cluster of switches.

6. The method of claim 5, wherein the first unit is a leader or master switch of the cluster of switches.

7. The method of claim 1, wherein identifying the event that has occurred that triggers initiation of the transaction comprises identifying that user input has been received by the first unit.

8. The method of claim 7, wherein the user input indicates a configuration change of a unit within the multi-unit system.

9. The method of claim 7, wherein the first unit and second unit are each switches in a cluster of switches, and wherein the user input indicates a configuration change of a switch within the cluster of switches.

10. The method of claim 1, wherein identifying the event that has occurred that triggers initiation of the transaction comprises identifying a status of a packet or identifying a status of a packet-handling queue.

11. The method of claim 1, wherein the transaction identifier comprises a sequence number associated with the transaction.

12. The method of claim 11, wherein the event is a first event, the transaction is a first transaction, the transaction identifier is a first transaction identifier, and the sequence number is a first sequence number, the method further comprising:
    identifying, by the first unit of a multi-unit system of computing devices, a second event has occurred that triggers initiation of a second transaction, the second event associated with the application;
    generating, by the first unit, a second transaction identifier associated with the second transaction, the second transaction identifier comprising the unit identifier of the first unit, the application identifier, and a second sequence number different from the first sequence number; and
    transmitting, from the first unit and to the second unit of the multi-unit system, the second transaction identifier as part of an inter-unit message.

13. The method of claim 11, wherein generating the transaction identifier comprises incrementing a sequence number counter.

14. A method comprising:
    receiving, by a second unit of a multi-unit system of computing devices and from a first unit of the multi-unit system, an inter-unit message indicating a transaction identifier associated with a transaction, wherein the transaction comprises a sequence of operations, with at least one first operation of the sequence of operations executed by the first unit of the multi-unit system and at least one second operation of the sequence of operations to be executed by the second unit of the multi-unit system;
    executing, by the second unit, the at least one second operation of the transaction; and
    recording, by the second unit and in a second log associated with the second unit, a log entry associated with the executed at least one second operation of the transaction and comprising the transaction identifier, wherein the transaction identifier comprises a unit identifier of the first unit and an application identifier of an application executed by the first unit.

15. The method of claim 14, wherein the first unit and second unit are each switches in a cluster of switches.

16. The method of claim 14, wherein the at least one second operation executed by the second unit comprises changing a configuration state of the second unit responsive to a user input received by the first unit.

17. A method comprising:
identifying, by a first unit of a multi-unit system of computing devices, that an event has occurred that triggers initiation of a transaction, wherein the transaction comprises a sequence of operations, with at least one first operation of the sequence of operations to be executed by the first unit and at least one second operation of the sequence of operations to be executed by a second unit of the multi-unit system;
executing, by the first unit, the at least one first operation of the transaction;
detecting, by the first unit, that a transaction identifier associated with the transaction is to be generated;
generating, by the first unit and responsive to the detecting, a transaction identifier associated with the transaction, the transaction identifier comprising a unit identifier of the first unit and an application identifier of an application associated with the event; and
transmitting, from the first unit and to the second unit of the multi-unit system, the transaction identifier as part of an inter-unit message.

18. The method of claim 17, wherein the detecting, by the first unit, that the transaction identifier associated with the transaction is to be generated comprises detecting that a log entry is to be recorded regarding the execution of the at least one first operation.

19. The method of claim 17, wherein the detecting, by the first unit, that the transaction identifier associated with the transaction is to be generated comprises detecting that the inter-unit message is to be sent regarding the transaction.

20. The method of claim 17, wherein the first unit and second unit are each switches in a cluster of switches.

* * * * *